United States Patent
Sun et al.

(10) Patent No.: US 12,057,932 B2
(45) Date of Patent: *Aug. 6, 2024

(54) TECHNIQUES AND APPARATUSES FOR IMPLICIT UPLINK CONTROL INFORMATION BETA VALUE DETERMINATION IN NEW RADIO

(71) Applicant: QUALCOMM Incorporated, San Diego, CA (US)

(72) Inventors: Jing Sun, San Diego, CA (US); Yi Huang, San Diego, CA (US); Heechoon Lee, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 89 days.

This patent is subject to a terminal disclaimer.

(21) Appl. No.: 17/445,650

(22) Filed: Aug. 23, 2021

(65) Prior Publication Data

US 2021/0385002 A1  Dec. 9, 2021

Related U.S. Application Data

(63) Continuation of application No. 16/168,453, filed on Oct. 23, 2018, now Pat. No. 11,177,903.

(Continued)

(51) Int. Cl.
*H04W 72/04* (2023.01)
*H04L 1/00* (2006.01)
(Continued)

(52) U.S. Cl.
CPC .......... *H04L 1/0003* (2013.01); *H04L 1/0004* (2013.01); *H04L 1/0009* (2013.01);
(Continued)

(58) Field of Classification Search
None
See application file for complete search history.

(56) References Cited

U.S. PATENT DOCUMENTS

| 8,670,496 B2 | 3/2014 | Nam et al. |
| 10,075,309 B2 | 9/2018 | Chen et al. |

(Continued)

FOREIGN PATENT DOCUMENTS

| CA | 2646321 A1 | 9/2007 |
| CN | 102264099 A | 11/2011 |

(Continued)

OTHER PUBLICATIONS

International Search Report and Written Opinion—PCT/US2018/057293—ISA/EPO—Feb. 5, 2019.

(Continued)

*Primary Examiner* — Willie J Daniel, Jr.
(74) *Attorney, Agent, or Firm* — Guang Yu Zhang; Harrity & Harrity, LLP

(57) ABSTRACT

Certain aspects of the present disclosure generally relate to wireless communication. In some aspects, a user equipment (UE) may identify a modulation and coding scheme (MCS) for an uplink communication of the UE; identify a set of beta values for uplink control information of the uplink communication according to a mapping between the set of beta values and the MCS, wherein the set of beta values is for determination of a number of resource elements or modulation symbols for the uplink control information; and transmit the uplink control information based at least in part on the set of beta values. Numerous other aspects are provided.

28 Claims, 8 Drawing Sheets

Related U.S. Application Data

(60) Provisional application No. 62/577,677, filed on Oct. 26, 2017.

(51) Int. Cl.
    *H04L 1/1812*     (2023.01)
    *H04L 5/00*     (2006.01)
    *H04W 72/21*     (2023.01)

(52) U.S. Cl.
    CPC ............ *H04L 1/001* (2013.01); *H04L 1/0023* (2013.01); *H04L 1/1816* (2013.01); *H04L 5/001* (2013.01); *H04L 5/0053* (2013.01); *H04W 72/21* (2023.01)

(56) References Cited

U.S. PATENT DOCUMENTS

| | | | |
|---|---|---|---|
| 11,177,903 B2 * | 11/2021 | Sun | ......................... H04L 1/001 |
| 2011/0310853 A1 * | 12/2011 | Yin | ....................... H04L 1/0009 |
| | | | 370/335 |
| 2019/0132075 A1 | 5/2019 | Sun et al. | |

FOREIGN PATENT DOCUMENTS

| | | |
|---|---|---|
| CN | 104780018 A | 7/2015 |
| EP | 1788744 A2 | 5/2007 |
| EP | 2378691 A2 | 10/2011 |
| WO | 2008084810 A1 | 7/2008 |
| WO | 2015164251 | 10/2015 |
| WO | 2017099860 A1 | 6/2017 |
| WO | 2017171956 A1 | 10/2017 |

OTHER PUBLICATIONS

ZTE: "Remaining Issues for UCI Multiplexing on PUSCH with MIMO Transmission", R1-104678, 3GPP TSG RAN WG1 Meeting #62, Madrid, Spain, Aug. 23-27, 2010, Aug. 17, 2010.

* cited by examiner

TECHNIQUES AND APPARATUSES FOR IMPLICIT UPLINK CONTROL INFORMATION BETA VALUE DETERMINATION IN NEW RADIO

CROSS-REFERENCE TO RELATED APPLICATIONS UNDER 35 U.S.C. § 119

This application claims priority to U.S. patent application Ser. No. 16/168,453, filed on Oct. 23, 2018, entitled "TECHNIQUES AND APPARATUSES FOR IMPLICIT UPLINK CONTROL INFORMATION BETA VALUE DETERMINATION IN NEW RADIO," which claims priority to U.S. Provisional Patent Application No. 62/577,677, filed on Oct. 26, 2017, entitled "TECHNIQUES AND APPARATUSES FOR IMPLICIT UPLINK CONTROL INFORMATION BETA VALUE DETERMINATION IN NEW RADIO," the contents of which are incorporated herein by reference in their entireties.

FIELD OF THE DISCLOSURE

Aspects of the present disclosure relate to wireless communication and to techniques and apparatuses for implicit uplink control information (UCI) beta value determination for New Radio (NR).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying a modulation and coding scheme (MCS) for an uplink communication of the UE; identifying a set of beta values for uplink control information of the uplink communication according to a mapping between the set of beta values and the MCS, wherein the set of beta values is for determination of a number of resource elements or modulation symbols for the uplink control information; and transmitting the uplink control information based at least in part on the set of beta values.

In some aspects, a UE for wireless communication may include memory and one or more processors operatively coupled to the memory. The memory and the one or more processors may be configured to identify an MCS for an uplink communication of the UE; identify a set of beta values for uplink control information of the uplink communication according to a mapping between the set of beta values and the MCS, wherein the set of beta values is for determination of a number of resource elements or modulation symbols for the uplink control information; and transmit the uplink control information based at least in part on the set of beta values.

In some aspects, a non-transitory computer-readable medium may store one or more instructions for wireless communication. The one or more instructions, when executed by one or more processors of a UE, may cause the one or more processors to identify an MCS for an uplink communication of the UE; identify a set of beta values for uplink control information of the uplink communication according to a mapping between the set of beta values and the MCS, wherein the set of beta values is for determination of a number of resource elements or modulation symbols for the uplink control information; and transmit the uplink control information based at least in part on the set of beta values.

In some aspects, an apparatus for wireless communication may include means for identifying an MCS for an uplink communication of the apparatus; means for identifying a set of beta values for uplink control information of the uplink communication according to a mapping between the set of beta values and the MCS, wherein the set of beta values is for determination of a number of resource elements or modulation symbols for the uplink control information; and means for transmitting the uplink control information based at least in part on the set of beta values.

In some aspects, a method of wireless communication, performed by a base station, may include transmitting information identifying a plurality of sets of beta values, wherein the plurality of sets of beta values are for determination of a number of modulation symbols for uplink control information of an uplink communication; and transmitting information identifying a mapping between the plurality of sets of beta values and MCSs of the uplink communication.

In some aspects, a base station for wireless communication may include memory and one or more processors operatively coupled to the memory. The memory and the one or more processors may be configured to transmit information identifying a plurality of sets of beta values, wherein the plurality of sets of beta values are for determination of a number of modulation symbols for uplink control information of an uplink communication; and transmit information identifying a mapping between the plurality of sets of beta values and MCSs of the uplink communication.

In some aspects, a non-transitory computer-readable medium may store one or more instructions for wireless communication. The one or more instructions, when executed by one or more processors of a base station, may cause the one or more processors to transmit information identifying a plurality of sets of beta values, wherein the plurality of sets of beta values are for determination of a number of modulation symbols for uplink control information of an uplink communication; and transmit information identifying a mapping between the plurality of sets of beta values and MCSs of the uplink communication.

In some aspects, an apparatus for wireless communication may include means for transmitting information identifying a plurality of sets of beta values, wherein the plurality of sets of beta values are for determination of a number of modulation symbols for uplink control information of an uplink communication; and means for transmitting information identifying a mapping between the plurality of sets of beta values and MCSs of the uplink communication.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
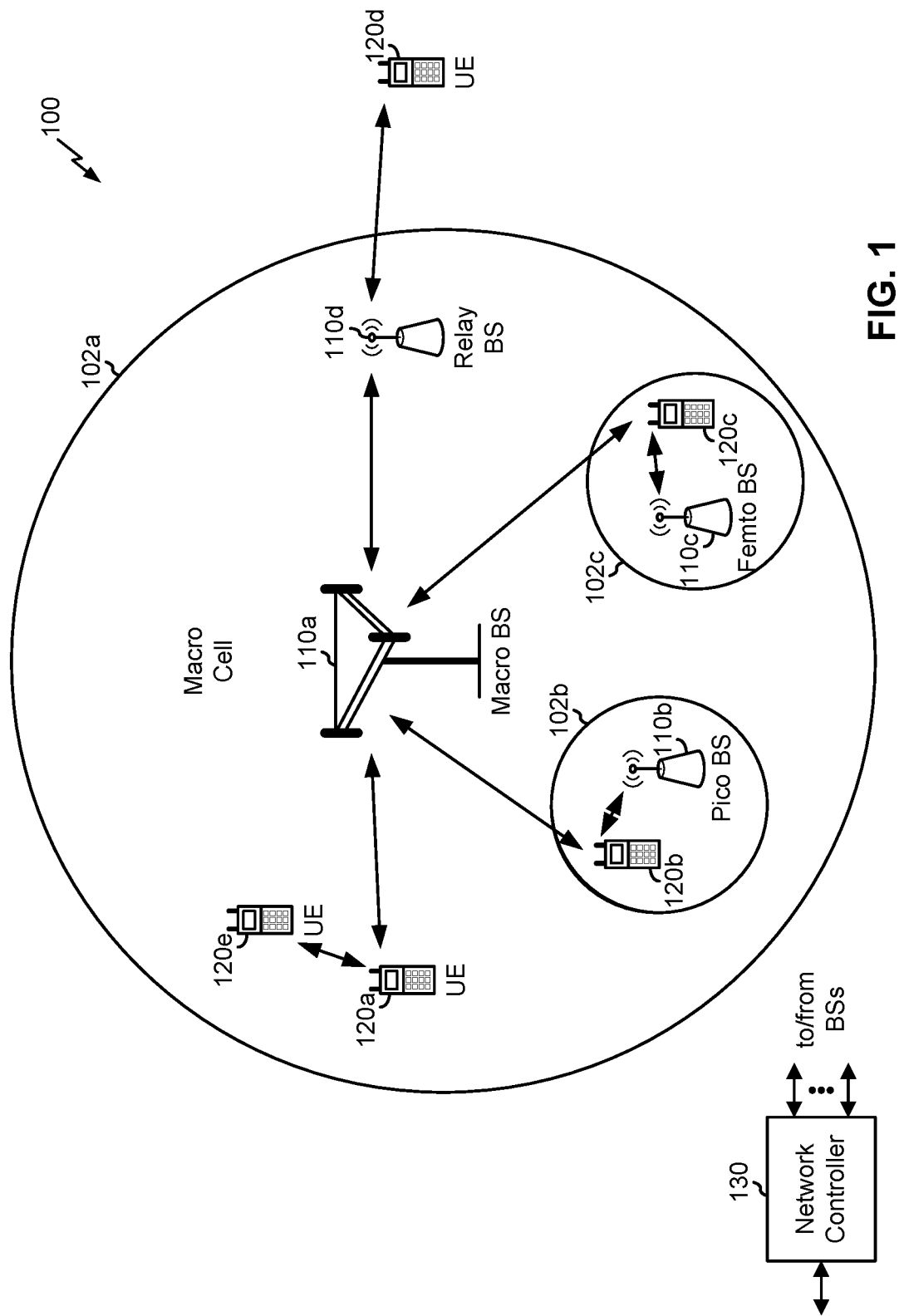
FIG. 1 is a block diagram conceptually illustrating an example of a wireless communication network, in accordance with certain aspects of the present disclosure.

A UE may determine how many modulation symbols are to be used for uplink control information (UCI) according to a beta value. For example, the UE may store information identifying a set of beta values including a plurality of entries (e.g., beta values) corresponding to respective UCI types (e.g., reference signal, channel state information, etc.). The UE may identify the appropriate beta value of the set of beta values based at least in part on a UCI type that the UE is to transmit. For example, a larger beta value may provide more modulation symbols for the UCI. A scheduling entity may select the beta value based at least in part on channel conditions (e.g., to improve resilience or increase a rate of the UCI based at least in part on channel conditions).

For a dynamically scheduled uplink data transmission (e.g., a physical uplink shared channel (PUSCH) transmission), such as in 5G/NR, two or more sets of beta values may be configured using radio resource control signaling. The UE may use a particular set of beta values to identify a beta value that is relevant to UCI to be transmitted by the UE. This provides additional flexibility for the UCI in the 5G/NR radio access technology. In some aspects, a dedicated bit of a downlink control channel for an uplink data transmission may indicate which set of beta values is to be used. However, since the determination of an appropriate set of beta values may use similar criteria as a modulation and coding scheme (MCS) determination (e.g., channel conditions, throughput, etc.), it may be wasteful to use a dedicated bit to indicate which set of beta values is to be used.

Some techniques and apparatuses described herein provide for determination of a set of beta values by the UE without reference to a dedicated bit of downlink control information (DCI). For example, the UE may determine the set of beta values based at least in part on an MCS of an uplink communication. This may be particularly beneficial since MCS and beta value selection are both based at least in part on channel conditions of the UE. Thus, communication resources are conserved that would otherwise be used to signal the beta value or an index value corresponding to the set of beta values (e.g., the dedicated bit of DCI).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

In some aspects, BS 110 may transmit information identifying a plurality of sets of beta values, wherein the plurality of sets of beta values are for determination of a number of modulation symbols for uplink control information of an uplink communication; and transmit information identifying a mapping between the plurality of sets of beta values and MCSs of the uplink communication. UE 120 may identify an MCS for an uplink communication of the UE 120; identify a set of beta values for uplink control information of the uplink communication according to the mapping; and transmit the uplink control information based at least in part on the set of beta values.

As indicated above, FIG. 1 is provided merely as an example. Other examples are possible and may differ from what was described with regard to FIG. 1.

Figure 2:
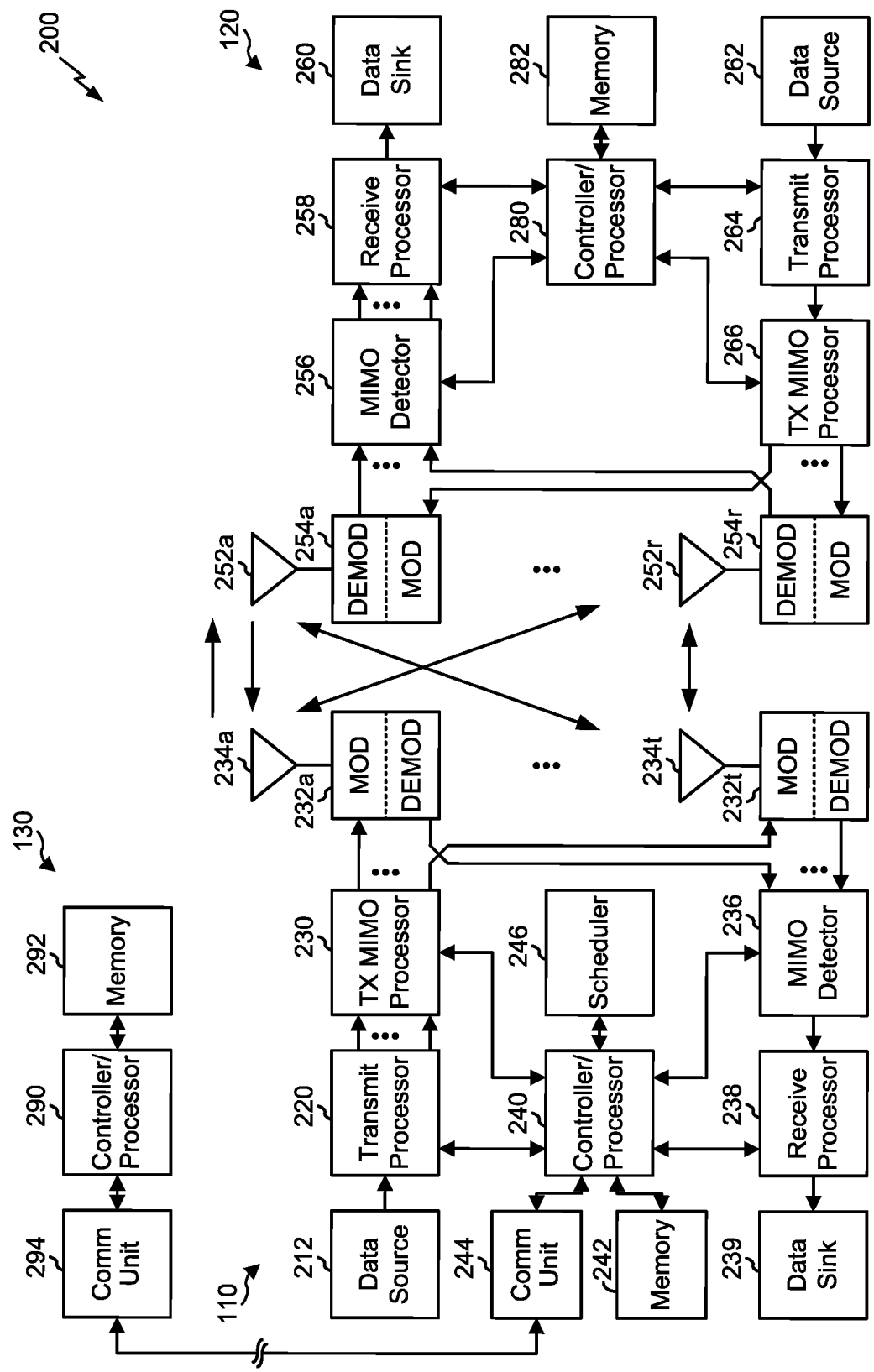
FIG. 2 is a block diagram conceptually illustrating an example of a base station in communication with a user equipment (UE) in a wireless communication network, in accordance with certain aspects of the present disclosure.

FIG. 2 shows a block diagram of a design 200 of BS 110 and UE 120, which may be one of the base stations and one of the UEs in FIG. 1. BS 110 may be equipped with T antennas 234*a* through 234*t*, and UE 120 may be equipped with R antennas 252*a* through 252*r*, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to certain aspects described in more detail below, the synchronization signals can be generated with location encoding to convey additional information.

At UE 120, antennas 252*a* through 252*r* may receive the downlink signals from BS 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based at least in part on a beta value or a set of beta values associated with the one or more reference signals). The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with implicit UCI beta value determination for NR, as described in more detail elsewhere herein. For example, controller/processor 240 of BS 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for identifying an MCS for an uplink communication of the UE 120; means for identifying a set of beta values for uplink control information of the uplink communication according to a mapping between the set of beta values and the MCS; means for transmitting the uplink control information based at least in part on the set of beta values; means for receiving, from a BS 110, configuration information identifying the mapping; and/or the like. In some aspects, such means may include one or more components of UE 120 described in connection with FIG. 2.

In some aspects, BS 110 may include means for transmitting information identifying a plurality of sets of beta values; means for transmitting information identifying a mapping between the plurality of sets of beta values and MCSs of the uplink communication; means for transmitting the uplink control information based at least in part on the set of beta values; means for receiving, from a UE 120, configuration information identifying the mapping; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3A:
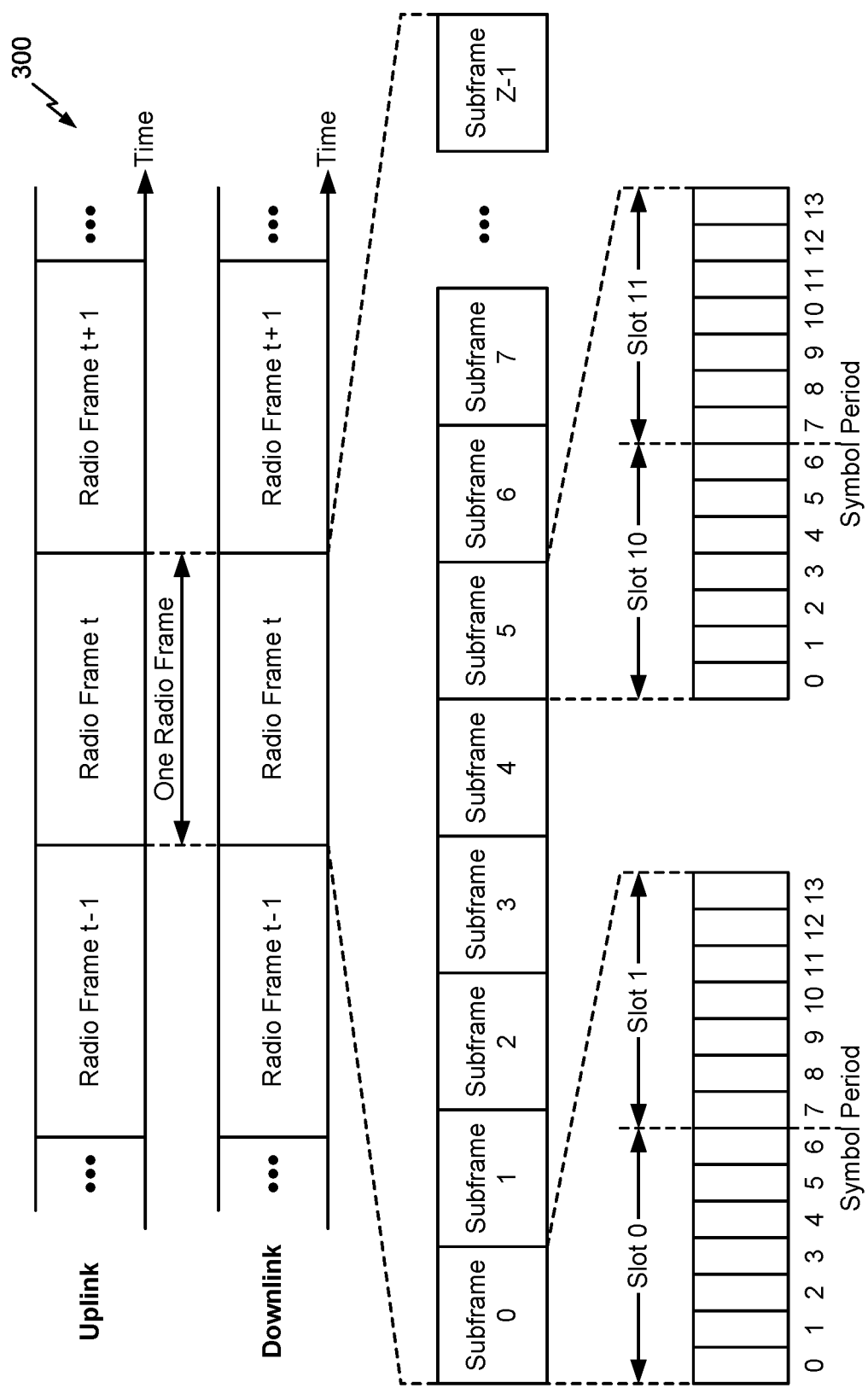
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
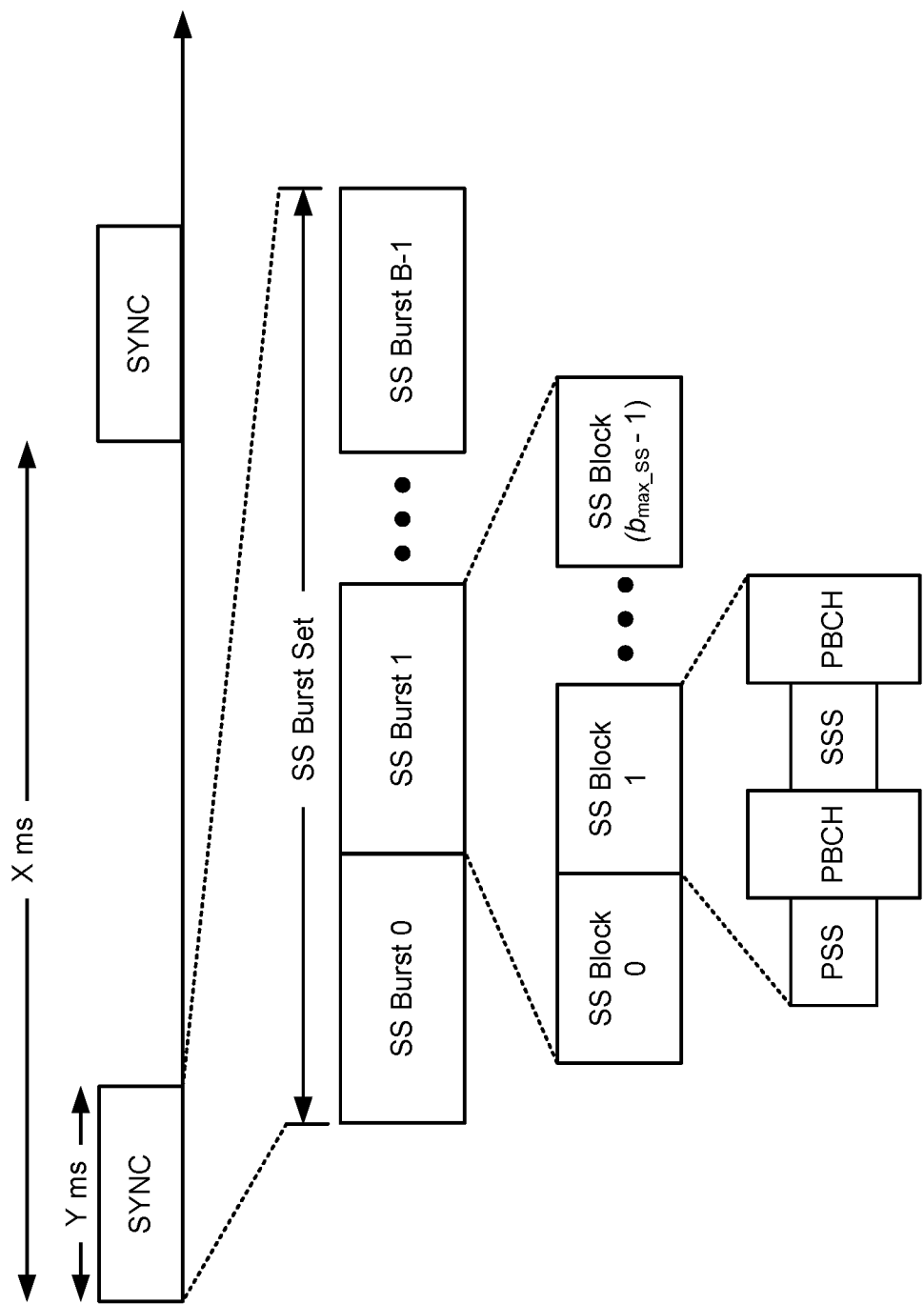
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where C may be configurable for each subframe. The base station may transmit traffic data and/or other data on the PDSCH in the remaining symbol periods of each subframe. In some aspects, the base station may transmit information identifying a mapping between MCSs and sets of beta values in the system information, the control information, or the other data.

As indicated above, FIGS. 3A and 3B are provided as examples. Other examples are possible and may differ from what was described with regard to FIGS. 3A and 3B.

Figure 4:
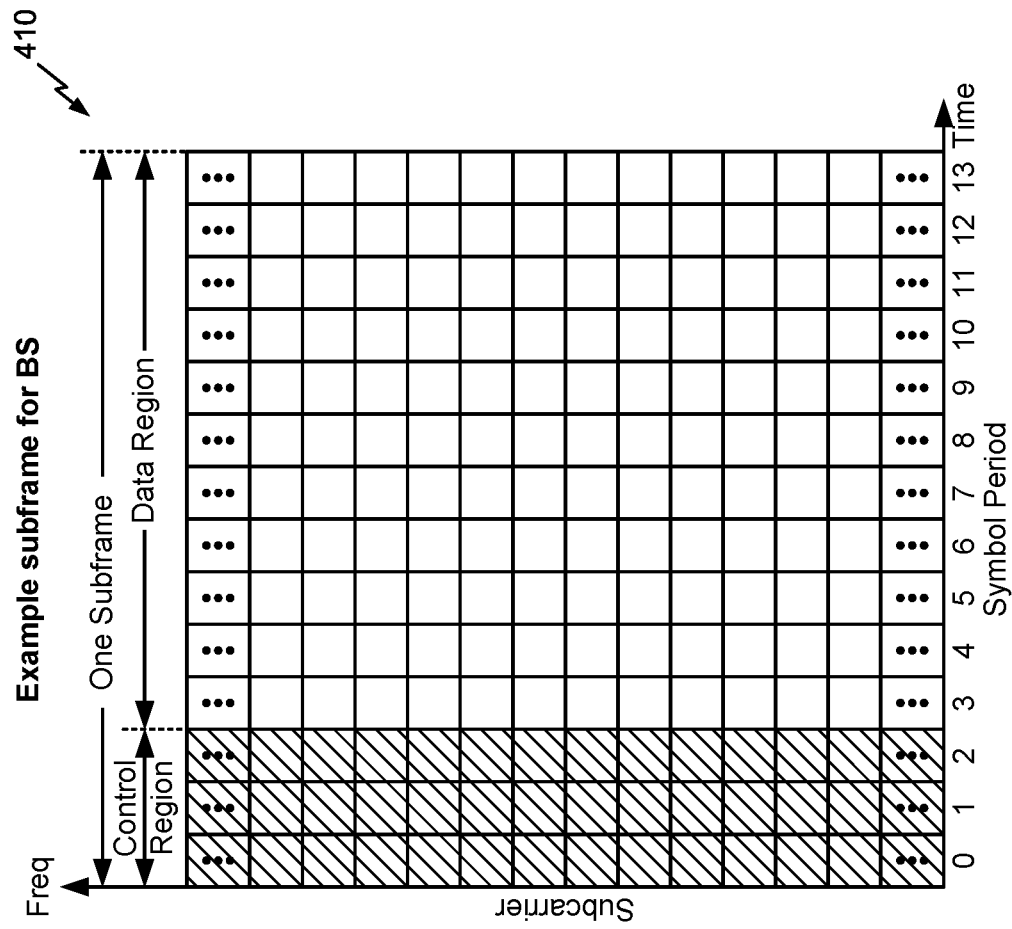
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
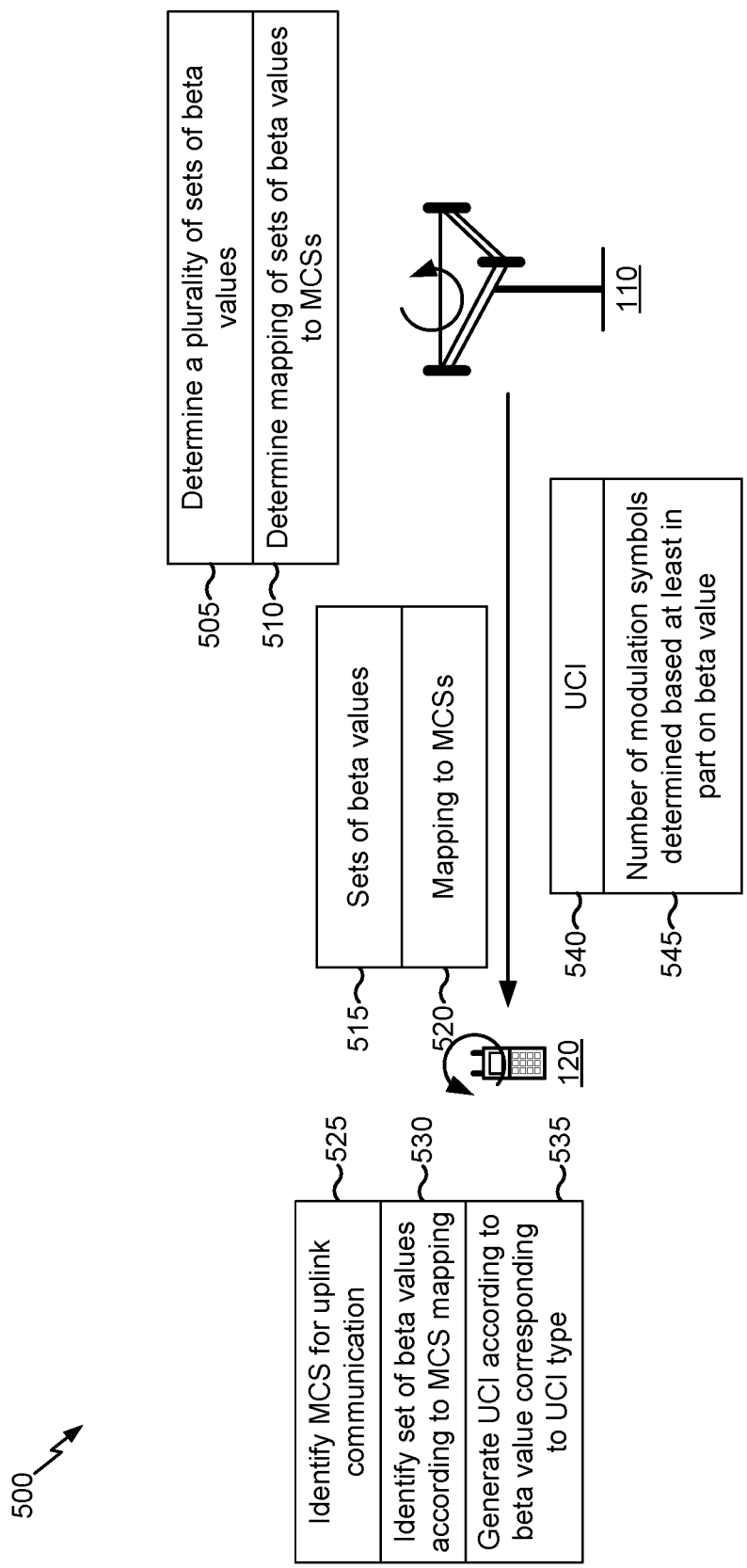
FIG. 5 is a diagram illustrating an example of implicit UCI beta value determination for NR, in accordance with various aspects of the present disclosure.

FIG. 5 is a diagram illustrating an example 500 of implicit UCI beta value determination for NR, in accordance with various aspects of the present disclosure.

As shown in FIG. 5, and by reference number 505, a BS 110 may determine a plurality of sets of beta values. For example, the BS 110 may determine two or more sets of beta values. A set of beta values may identify multiple beta values corresponding to different UCI types. Furthermore, different sets of beta values may identify different values for a particular UCI type. For example, one set of beta values may have a higher beta value for a particular UCI type than another set of beta values. This may provide flexibility in modulation symbol assignment for different UCI types. For example, the BS 110 can configure a first amount of modulation symbols, corresponding to a beta value of a first set, to be used when channel conditions are poor, and can configure a second amount of modulation symbols, corresponding to a beta value of a second set, to be used when channel conditions are good. In some aspects, the BS 110 may store or have access to information identifying the two or more sets of beta values. For example, the two or more sets of beta values may be predefined, may be hardcoded, may be specified in a specification, and/or the like.

As shown by reference number 510, the BS 110 may determine a mapping of the sets of beta values to MCSs. For example, each set of beta values may be mapped to one or more MCS indices. This may be beneficial because the UE 120 may determine an MCS for an uplink communication of the UE 120, and may use the mapping to identify a corresponding beta value, thereby eliminating the need for explicit signaling of the beta value to be used by the UE 120. In some aspects, the mapping may be defined in a specification (e.g., may be hard-coded). Additionally, or alternatively, the BS 110 may determine the mapping (e.g., on the fly, based at least in part on channel conditions, etc.). In some aspects, the mapping for a particular set of beta values may include two or more non-consecutive MCSs. In some aspects, the mapping for a particular set of beta values may include two or more consecutive MCSs. As just one example, MCSs 0-5, 11-15, 21-24 may map to a first set of beta values, and MCSs 6-10, 16-20, and 25-28 may map to a second set of beta values.

In some aspects, the mapping may be an explicit mapping between the MCS and a set of beta values. For example, the BS 110 may determine or provide information identifying each MCS index and indicating which set of beta values corresponds to each MCS index.

In some aspects, the mapping may be based at least in part on a threshold MCS of a set of MCSs associated with a particular modulation order. For example, an MCS index may be associated with a particular modulation order (e.g., 2 for quadrature phase shift keying (QPSK), 4 for 16-bit quadrature amplitude modulation (16-QAM), 6 for 64-QAM, etc.). Furthermore, multiple different MCS indices may be associated with each modulation order, as defined in Table 8.6.1-1 of 3GPP technical specification (TS) 36.213. In some aspects, the BS 110 may determine the mapping based at least in part on a threshold MCS (e.g., MCS index) of the set of MCSs associated with a particular modulation order. For example, MCS indices under a fifth MCS index associated with a particular modulation order may be associated with a first set of beta values, and MCS indices over the fifth MCS index associated with the particular modulation order may be associated with a second set of beta values. Note that any threshold value other than the fifth MCS index may be used.

In some aspects, the mapping may be based at least in part on a coding rate threshold. For example, each MCS index may be associated with a respective coding rate, and the set of MCS indices associated with a particular modulation order may have increasing coding rates. In some aspects, the BS 110 may determine the mapping based at least in part on a threshold coding rate. For example, MCS indices with a coding rate that does not satisfy a threshold value may map to a first set of beta values, and MCS indices with a coding rate that satisfies the threshold value may map to a second set of beta values.

As shown by reference number 515, the BS 110 may transmit information identifying the plurality of sets of beta values. In some aspects, the BS 110 may transmit the information identifying the plurality of sets of beta values in the form of configuration information, such as radio resource control (RRC) configuration information and/or the like.

As shown by reference number 520, the BS 110 may transmit information identifying a mapping between the plurality of sets of beta values and MCSs of an uplink communication. For example, the BS 110 may transmit information identifying the mapping to the UE 120. The BS 110 may transmit the information identifying the mapping prior to, concurrent with, or after the BS 110 transmits the information identifying the plurality of sets of beta values. The information identifying the mapping may include a table of MCS-beta value mappings, configuration information identifying a threshold MCS, configuration information identifying a coding rate threshold, and/or the like. The UE 120 may receive configuration information identifying the mapping.

As shown by reference number 525, the UE 120 may identify an MCS (e.g., MCS index) for an uplink communication of the UE 120. For example, the UE 120 may identify the MCS based at least in part on uplink channel conditions, based at least in part on feedback from the BS 110, and/or the like.

As shown by reference number 530, the UE 120 may identify a set of beta values for UCI of the uplink communication according to a mapping between the set of beta values and the MCS (e.g., the MCS index). For example, the UE 120 may use the information identifying the mapping to identify the corresponding set of beta values. The UE 120 may identify the corresponding set of beta values to determine a number of resource elements or modulation symbols to be used for the UCI. For example, the UE 120 may determine the corresponding set of beta values, and may identify a particular beta value that corresponds to the UCI type to be transmitted by the UE 120.

As shown by reference number 535, the UE 120 may generate the UCI according to the particular beta value that corresponds to the UCI type of the UCI. For example, the UCI may include a number of modulation symbols identified by the particular beta value. In this way, the UE 120 may configure a UCI according to a particular set of beta values, which may be identified with reference to an MCS of the UE 120. Thus, signaling resources may be conserved that would otherwise be used to signal the particular beta value.

As shown by reference number 540, the UE 120 may transmit the UCI based at least in part on the set of beta values or the beta value. For example, and as shown by reference number 545, the UCI may include a number of modulation symbols that is determined based at least in part on the beta value. In this way, the UE 120 identifies an appropriate set of beta values based at least in part on an MCS of the UE 120 (e.g., without reference to a dedicated bit of the DCI), which conserves signaling resources that would otherwise be used to signal the appropriate set of beta values.

As indicated above, FIG. 5 is provided as an example. Other examples are possible and may differ from what was described with respect to FIG. 5.

Figure 6:
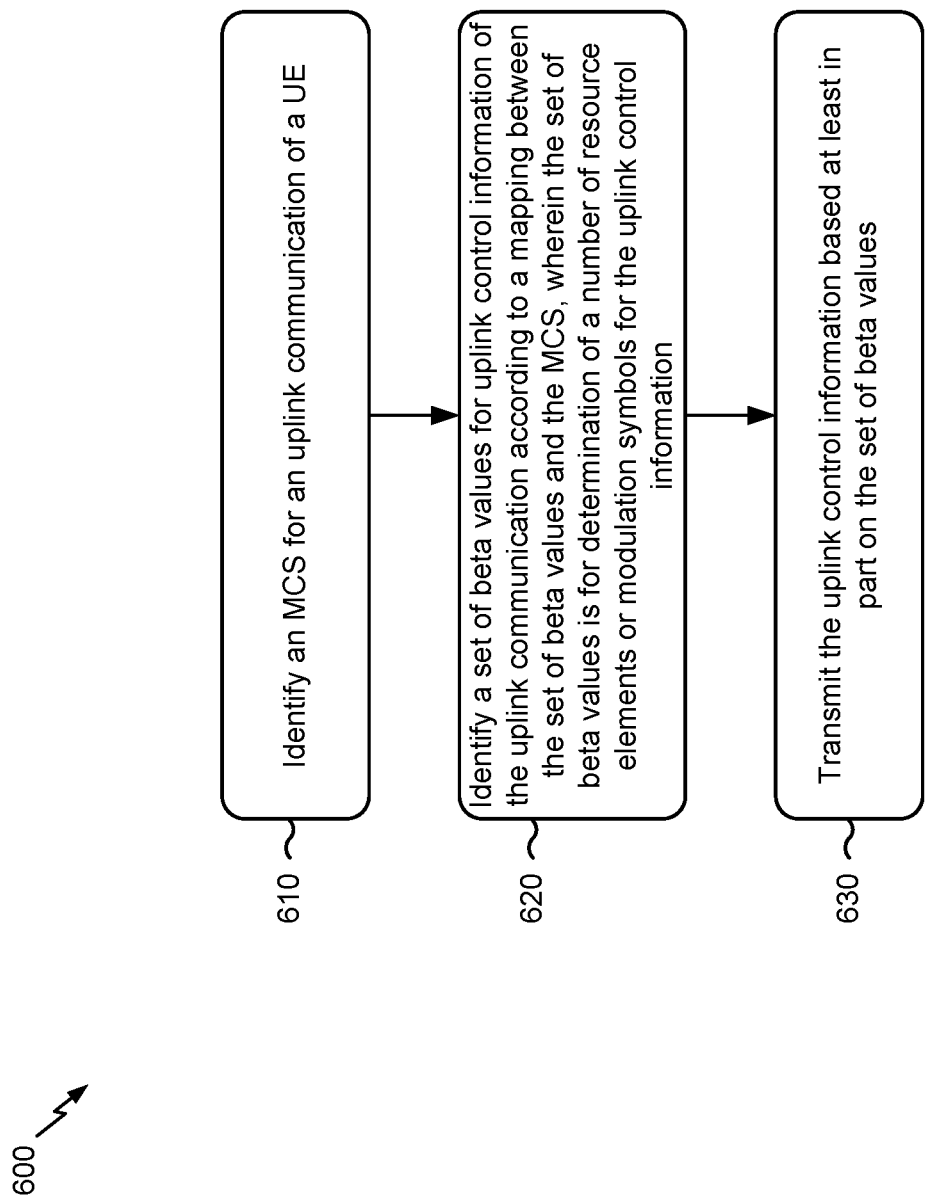
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs implicit UCI beta value determination for NR.

As shown in FIG. 6, in some aspects, process 600 may include identifying an MCS for an uplink communication of a UE (block 610). For example, the UE (e.g., using controller/processor 280 and/or the like) may identify an MCS for an uplink communication of the UE, as described in more detail elsewhere herein.

As shown in FIG. 6, in some aspects, process 600 may include identifying a set of beta values for uplink control information of the uplink communication according to a mapping between the set of beta values and the MCS, wherein the set of beta values is for determination of a number of resource elements or modulation symbols for the uplink control information (block 620). For example, the UE (e.g., using controller/processor 280 and/or the like) may identify a set of beta values, of a plurality of sets of beta values, for UCI of the uplink communication. The UE may identify the set of beta values based at least in part on a mapping between the set of beta values and the MCS. The set of beta values may be for determination of a number of resource elements or modulation symbols for the UCI.

As shown in FIG. 6, in some aspects, process 600 may include transmitting the uplink control information based at least in part on the set of beta values (block 630). For example, the UE (e.g., using controller/processor 280, transmit processor 264, TX MIMO processor 266, MOD 254, antenna 252, and/or the like) may transmit the UCI based at least in part on the set of beta values. For example, the UCI may include a number of modulation symbols that is indicated by a particular beta value of the set of beta values.

Process 600 may include additional aspects, such as any single aspect or any combination of aspects described below and/or in connection with one or more other processes described elsewhere herein.

In some aspects, the set of beta values is identified without reference to a dedicated bit of downlink control information. In some aspects, the UE may receive, from a base station, configuration information identifying the mapping. In some aspects, the set of beta values is one of a plurality of sets of beta values corresponding to respective MCSs. In some aspects, the mapping is between the set of beta values and a plurality of MCSs. In some aspects, at least two MCSs of the plurality of MCSs are not consecutive with each other. In some aspects, the uplink communication is a first transmission, and wherein the set of beta values is used for the first transmission and for a retransmission of the uplink communication. In some aspects, the mapping is an explicit mapping between the MCS and the set of beta values. In some aspects, the mapping is based at least in part on a threshold MCS of a set of MCSs associated with a particular modulation order. In some aspects, the mapping is based at least in part on a coding rate threshold.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
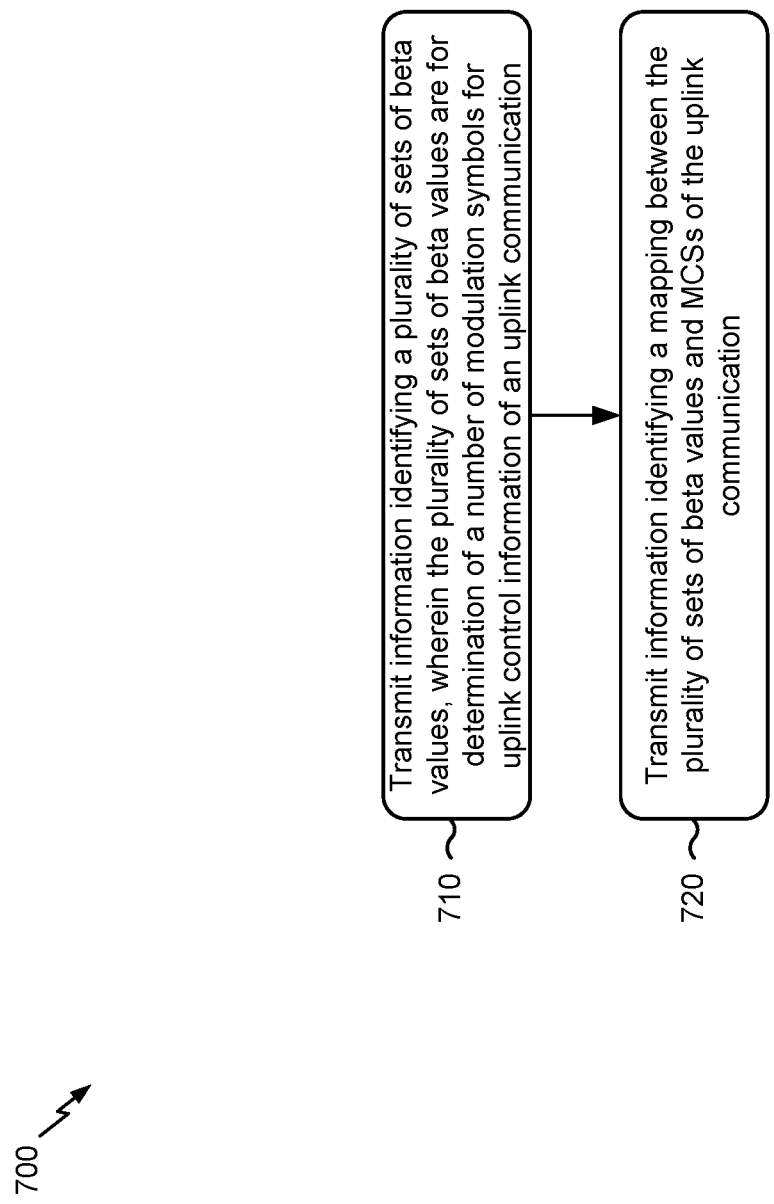
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where a base station (e.g., BS 110) performs implicit UCI beta value determination for NR.

As shown in FIG. 7, in some aspects, process 700 may include transmitting information identifying a plurality of sets of beta values, wherein the plurality of sets of beta values are for determination of a number of modulation symbols for uplink control information of an uplink communication (block 710). For example, the base station (e.g., using controller/processor 240, transmit processor 220, TX MIMO processor 230, MOD 232, antenna 234, and/or the like) may transmit information identifying a plurality of sets of beta values (e.g., 2 sets, 4 sets, or a different number of sets). The plurality of sets of beta values may each include one or more beta values for determination of a number of modulation symbols for UCI of an uplink communication.

As shown in FIG. 7, in some aspects, process 700 may include transmitting information identifying a mapping between the plurality of sets of beta values and MCSs of the uplink communication (block 720). For example, the base station (e.g., using controller/processor 240, transmit processor 220, TX MIMO processor 230, MOD 232, antenna 234, and/or the like) may transmit information identifying a mapping between the plurality of sets of beta values and MCSs of the uplink communication. In some aspects, the base station may determine the mapping.

Process 700 may include additional aspects, such as any single aspect or any combination of aspects described below and/or in connection with one or more other processes described elsewhere herein.

In some aspects, a plurality of MCSs are mapped for each set of beta values of the plurality of sets of beta values. In some aspects, at least two MCSs of the plurality of MCSs are not consecutive with each other. In some aspects, the uplink communication is a first transmission, and wherein the set of beta values is used for the first transmission and for a retransmission of the uplink communication. In some aspects, the mapping is an explicit mapping between the MCSs and the plurality of sets of beta values. In some aspects, the mapping is based at least in part on a threshold MCS of a set of MCSs associated with a particular modulation order. In some aspects, the mapping is based at least in part on a coding rate threshold.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors, coupled to the memory, configured to:
      receive, from a base station, configuration information identifying a mapping between a plurality of sets of beta values and a plurality of modulation and coding schemes (MCSs), wherein the mapping is based at least in part on a threshold MCS associated with a particular modulation order;
      determine a set of beta values, of the plurality of sets of beta values, according to the mapping; and
      send, in a message, uplink control information (UCI) based on the set of beta values, wherein the set of beta values is identified without reference in the message to a dedicated bit of downlink control information.

2. The UE of claim 1, wherein an MCS, of the plurality of MCSs, is mapped to the set of beta values based at least in part on the MCS being over the threshold MCS.

3. The UE of claim 1, wherein an MCS, of the plurality of MCSs, is mapped to the set of beta values based at least in part on the MCS being under the threshold MCS.

4. The UE of claim 1, wherein the set of beta values includes multiple beta values corresponding to different UCI types.

5. The UE of claim 1, wherein the information identifying the mapping comprises one or more of:
   a table of MCS-beta value mappings,
   configuration information identifying the threshold MCS, or
   configuration information identifying a coding rate threshold.

6. The UE of claim 1, wherein the particular modulation order is one of:
   2 for quadrature phase shift keying (QPSK),
   4 for 16-bit quadrature amplitude modulation (16-QAM), or
   6 for 64-QAM.

7. The UE of claim 1, wherein the one or more processors are further configured to:
   identify an MCS, of the plurality of MCSs, for an uplink communication of the UE based at least in part on one or more of uplink channel conditions or feedback from a base station, wherein the set of beta values correspond to the MCS.

8. The UE of claim 1, wherein the set of beta values is identified based at least in part on an MCS of the plurality of MCSs and without reference to a dedicated bit of downlink control information (DCI).

9. The UE of claim 1, wherein the one or more processors are further configured to:
   identify a particular beta value, of the set of beta values, that corresponds to a UCI type of the UCI that is to be transmitted by the UE.

10. The UE of claim 1, wherein the one or more processors are further configured to:
    generate the UCI according to a particular beta value of the set of beta values.

11. The UE of claim 1, wherein the UCI includes a number of modulation symbols identified by a particular beta value of the set of beta values.

12. A method of wireless communication performed by a user equipment (UE), comprising:
    receiving, from a base station, configuration information identifying a mapping between a plurality of sets of beta values and a plurality of modulation and coding schemes (MCSs), wherein the mapping is based at least in part on a threshold MCS associated with a particular modulation order;
    determining a set of beta values, of the plurality of sets of beta values, according to the mapping; and
    sending, in a message, uplink control information (UCI) based on the set of beta values, wherein the set of beta values is identified without reference in the message to a dedicated bit of downlink control information.

13. The method of claim 12, wherein an MCS, of the plurality of MCSs, is mapped to the set of beta values based at least in part on the MCS being over the threshold MCS.

14. The method of claim 12, wherein an MCS, of the plurality of MCSs, is mapped to the set of beta values based at least in part on the MCS being under the threshold MCS.

15. The method of claim 12, wherein the set of beta values includes multiple beta values corresponding to different UCI types.

16. The method of claim 12, wherein the information identifying the mapping comprises one or more of:
    a table of MCS-beta value mappings,
    configuration information identifying the threshold MCS, or
    configuration information identifying a coding rate threshold.

17. The method of claim 12, wherein the particular modulation order is one of:
    2 for quadrature phase shift keying (QPSK),
    4 for 16-bit quadrature amplitude modulation (16-QAM), or
    6 for 64-QAM.

18. The method of claim 12, further comprising:
identifying an MCS, of the plurality of MCSs, for an uplink communication of the UE based at least in part on one or more of uplink channel conditions or feedback from a base station, wherein the set of beta values correspond to the MCS.

19. The method of claim 12, wherein the set of beta values is identified based at least in part on an MCS of the plurality of MCSs and without reference to a dedicated bit of downlink control information (DCI).

20. The method of claim 12, further comprising:
identifying a particular beta value, of the set of beta values, that corresponds to a UCI type of the UCI that is to be transmitted by the UE.

21. The method of claim 12, further comprising:
generating the UCI according to a particular beta value of the set of beta values.

22. The method of claim 12, wherein the UCI includes a number of modulation symbols identified by a particular beta value of the set of beta values.

23. A non-transitory computer-readable medium storing a set of instructions for wireless communication, the set of instructions comprising:
one or more instructions that, when executed by one or more processors of a user equipment (UE), cause the UE to:
receive, from a base station, configuration information identifying a mapping between a plurality of sets of beta values and a plurality of modulation and coding schemes (MCSs), wherein the mapping is based at least in part on a threshold MCS associated with a particular modulation order;
determine a set of beta values, of the plurality of sets of beta values, according to the mapping; and
send, in a message, uplink control information (UCI) based on identifying the set of beta values, wherein the set of beta values is identified without reference in the message to a dedicated bit of downlink control information.

24. The non-transitory computer-readable medium of claim 23, wherein an MCS, of the plurality of MCSs, is mapped to the set of beta values based at least in part on the MCS being over the threshold MCS.

25. The non-transitory computer-readable medium of claim 23, wherein an MCS, of the plurality of MCSs, is mapped to the set of beta values based at least in part on the MCS being under the threshold MCS.

26. An apparatus for wireless communication, comprising:
means for receiving, from a base station, configuration information identifying a mapping between a plurality of sets of beta values and a plurality of modulation and coding schemes (MCSs), wherein the mapping is based at least in part on a threshold MCS associated with a particular modulation order;
means for determining a set of beta values, of the plurality of sets of beta values, according to the mapping; and
means for sending, in a message, uplink control information (UCI) based on identifying the set of beta values, wherein the set of beta values is identified without reference in the message to a dedicated bit of downlink control information.

27. The apparatus of claim 26, wherein an MCS, of the plurality of MCSs, is mapped to the set of beta values based at least in part on the MCS being over the threshold MCS.

28. The apparatus of claim 26, wherein an MCS, of the plurality of MCSs, is mapped to the set of beta values based at least in part on the MCS being under the threshold MCS.

* * * * *